Nov. 10, 1953     I. D. EBY     2,658,389
PRESSURE RESPONSIVE DEVICE FOR DETERMINING
THE DEPTH OF LIQUIDS
Filed Sept. 26, 1950
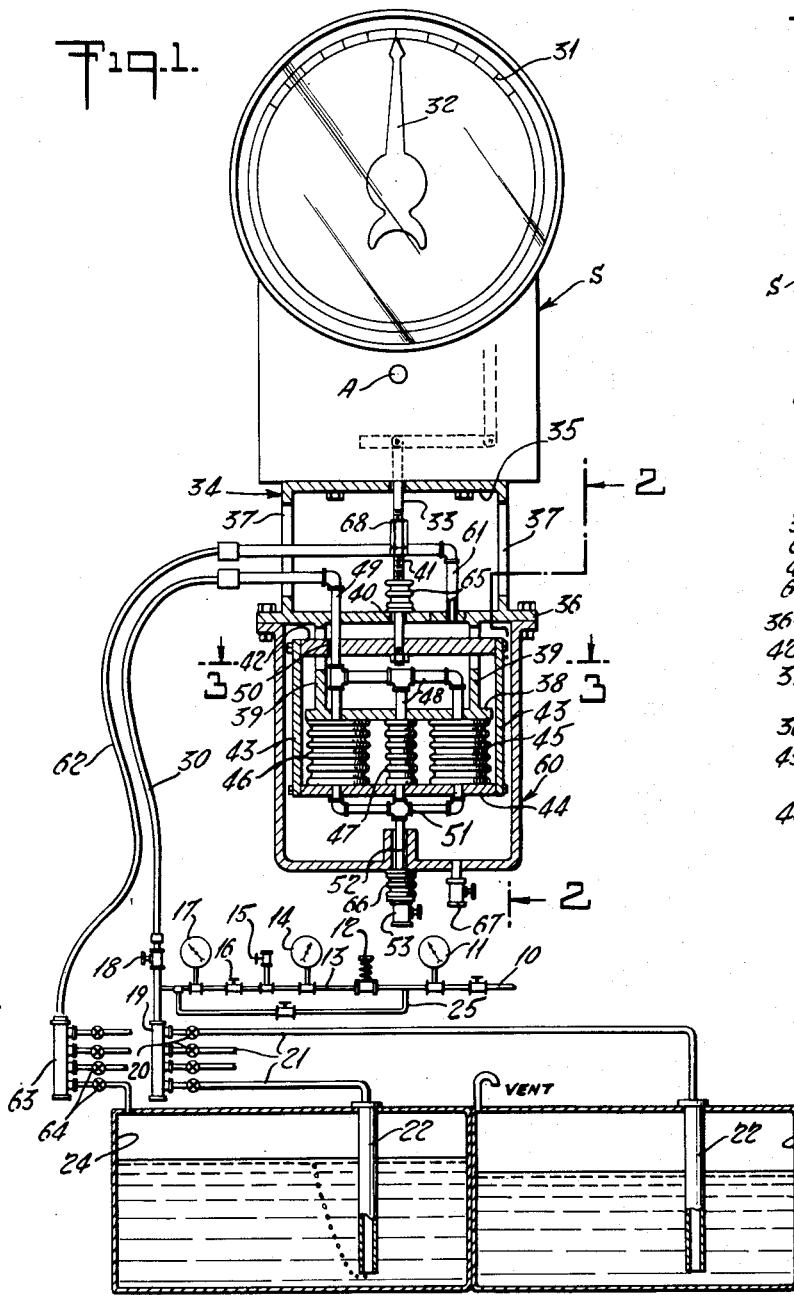
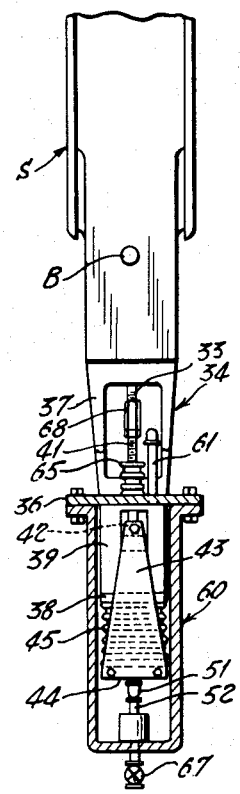
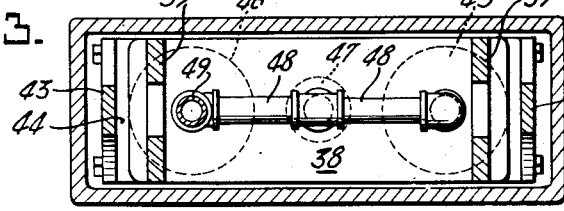
INVENTOR
IVAN D. EBY
BY John M. Cole
ATTORNEY Patented Nov. 10, 1953

2,658,389

UNITED STATES PATENT OFFICE 2,658,389

PRESSURE RESPONSIVE DEVICE FOR DETERMINING THE DEPTH OF LIQUIDS

Ivan D. Eby, New York, N. Y.

Application September 26, 1950, Serial No. 186,708

10 Claims. (Cl. 73—302)

1

The present invention relates to pressure responsive devices for determining the depth of liquids and method of making the same, and is more particularly directed toward devices for these purposes and adapted for use on shipboard.

On shipboard liquids are carried in tanks as cargo or as ship's fuel, water is used as ballast, and water and leakage is or may be present in the bilges. It is important at all times to have an accurate record of the depth of the liquid in each and every tank and in each bilge at regular intervals and to be able to ascertain at any time the depth in any particular tank or bilge, and proper records require the making of at least two log entries each day of the soundings. The tanks and bilges are provided with sounding pipes leading from the decks or from some other accessible part of the ship, and it has been the practice to make direct measurements with sounding rods lowered into these pipes. Some of these pipes open on upper deck in locations where they cannot be opened in stormy weather, and the sounding of these lines had to be omitted or postponed until weather conditions made sounding possible. The time required for such determinations was considerable, and, owing to the distance which had to be covered, the quick determination of conditions at remote location was impossible.

The present invention contemplates the equipment of the ship with apparatus whereby all the tanks used for storage of fuel, cargo or ballast, and all bilges may be sounded from a centrally located station on board the ship at any time and under substantially any and all conditions which arise on shipboard.

In carrying out the present invention a source of compressed air is employed and by means of a system of piping, valves, pressure gauges, and the like, the air is caused to bubble out under the end of a submerged sounding pipe in the tank or bilge to be measured, and the pressure of air is brought to that necessary to maintain such bubbling. This pressure determination is then available to determine the depth of the liquid. The measuring apparatus may be located in the upper engine room or any place convenient for the ship's officers, and the measurements entered in the ship's log.

While the apparatus is more particularly suitable for use on shipboard, it is also possible to apply the same in other locations where the sounding of many tanks is necessary, as in many manufacturing and liquid storing operations.

According to the present invention the device employed for making a pressure determination includes a weighing scale with relatively movable pointer and graduated dial and pressure responsive devices in the form of expansible bellows which operate without leakage or friction. In this manner the increments of pressure required for the gaging operation are accurately transferred to the weighing mechanism.

Where the devices to be used in gaging tanks open to the atmosphere the bellows are subjected to external atmospheric pressure and to pressure above atmospheric on the inside, but where gaging of tanks kept under pressure is to take place, the air or gas pressure in the tank is transmitted into a closed pressurizing chamber which receives the bellows so that the additional pressure, proportional to liquid depth is registered on the scale.

Other and further objects will appear as the description proceeds.

For purposes of illustrating the present invention the drawings show an embodiment in which the invention may take form, together with modifications, it being understood that the drawings are illustrative of the invention rather than limiting the same.

In these drawings:

Figure 1 is a view diagrammatically showing the piping and tanks to be gaged, together with a vertical section through the pressure responsive parts of the apparatus employed in gaging the liquid depth, details of construction of the support of the device being omitted;

Figure 2 is a side elevational view of the apparatus of Figure 1 with parts in section on the line 2—2, omitting the piping; and Figure 3 is a transverse sectional view on the line 3—3 of Figure 1.

Where the apparatus is used on shipboard it is connected into the usual high pressure air line indicated at 10. The air pressure is indicated by pressure gage 11 and the air passes through a reducing valve 12 into a low pressure line 13. This line is connected to a low pressure gage 14, a vent 15 and a regulator valve 16. Beyond the regulator valve 16 is a pressure gage 17, a branch leading to a cutoff valve 18 and a branch to a manifold 19. The manifold 19, through valve connections 20, may be connected to any of the various air lines 21 and directed through a selected tube 22 into a selected tank such as indicated at 23, 24. It is forced under the liquid in the tank, provided sufficient pressure is available.

The amount of pressure required depends upon the hydraulic head on the submerged end of the pipe or tube 22, plus the pressure above atmospheric which exists on the surface of the liquid, as in a closed tank 24. Owing to the release of pressure by the bubbling action, the pressure falls to the pressure required for creating the bubbles. A bypass 25 is provided below the lines whenever desired.

The cutoff valve 18 is connected through a flexible hose 30 with the operating mechanism for the indicating instrument. This indicating instrument and its operating mechanism are in the form of a preassembled unit, usually mounted on the gimbal bearings having axes indicated at A and B so that the entire assemblage hangs vertically.

The structure indicated at S, which may be embodied in the usual mechanism found in a platform weighing scale, has a relatively fixed graduated dial 31, movable pointer 32 and pointer operating mechanism of usual scale construction which includes a downwardly extending rod 33 ordinarily used to support the scale pan or other load being weighed. The body of the structure S is secured to a "scale" frame 34 of suitable construction and adapted to be mounted on the gimbal bearings. This frame may be made up of assembled plates, bolts, spacers and the like or in the form of a casting. It is here shown as a casting having an upper plate-like element 35 secured to the bottom of the commercial weighing scale body, an intermediate plate 36 supported by means of legs 37, 37 and a lower plate 38 supported from the plate 36 by apertured legs 39, 39. The plate 36 is provided with a central aperture 40 in line with the load supporting rod 33 and a tension rod 41 carried by the rod 33 passes down through the opening 40. The lower end of the rod 41 is connected to a sub-frame which is here shown as having an upper plate 42, side members 43, 43 and a bottom or lower plate 44. This sub-frame forms a yoke and, where 36 is a casting, is preferably assembled out of subordinate pieces. Upper bar 42 passes through the openings in the legs 39 of the first frame and the side members 43, 43 extend down outside the lower plate 38 of the first frame so as to space the lower plate 44 below the plate 38.

Mounted between the plates 38 and 44 are three expansible metal bellows 45, 46 and 47, often referred to as "sylphons." The upper ends of these bellows are connected through piping indicated at 48, 49 with the flexible hose connection 30. The piping 48 and 49 is fixedly carried by the frame 34 and moves with the frame 34 as the entire assemblage swings on the gimbal bearings. The piping passes through an oversized opening 50 in plate 42 so that the plate 42 can move freely relative to this piping. The lower ends of the bellows 45, 46 and 47 are connected by piping, indicated generally at 51, with a drain pipe 52 which connects to a drain cock 53, and this piping and drain cock move with the sub-frame.

In the form shown in the drawings, the plate 36 carries a pressurizing housing member 60, which encloses the lower part of the frame 34, the bellows, the piping and the sub-frame carried by the rod 40. The plate 36 carries a pipe 61 opening into the chamber formed by the housing 60 and connected through flexible hose 62 with the manifold 63. The manifold is connected through various valves such as 64 with the top of sealed tanks such as 24 so that when a valve such as 64 is open, the pressure on the liquid in the tank 24 can be transmitted to the pressure chamber. In order to prevent leakage around the rod 41 and the drain pipe 52, flexible metal bellows are provided as indicated at 65 and 66. These balance one another. A drain 67 is also provided so as to drain the housing member 60.

It is impossible in manufacturing practices to obtain large bellows such as 45 and 46 of sufficiently accurate size to have the required accuracy in effective area for the purpose. The "scale" dial is graduated in pounds, and 27.72" of fresh water is required to create one pound per square inch pressure. In order that the scale reading may be correct with a specific gravity of 1, the overall area of the three bellows should be as close as possible to 27.7 square inches. It is possible to obtain two large sheet metal bellows having an area of approximately 13 square inches each or a total of approximately 26 square inches. The two bellows will therefore lack a small area, something in the order of 1 to 2 square inches. The small centrally located bellows 47 is selected as to size so as to just make up the deficiency in area. These small sized bellows can be made with much closer tolerances than the big ones and it is readily possible by using two large bellows, each almost large enough to supplement them by a third bellows which acts as a trimmer so as to obtain the desired total area within the limits of accuracy of the scale. The bellows are secured in between the plates by the usual fittings used with such bellows and by means of a nut indicated at 68 between the rods 33 and 41, suitable tension is applied to the bellows to load the scale and bring the pointer to zero. Thereafter, the scale reading brought about by applying pressure internally in the bellows will indicate the pressure developed by the compressed air forced into the bellows. By suitable specific gravity tables it is readily possible to determine the depths of the liquid in the remote tank which built up, owing to the unknown depth of the liquid, the pressure which is applied to the bellows.

When measuring depths of liquid in tanks open to the atmospheric pressure (such as tank 23), chamber 60 is vented by opening the drain 67 so that atmospheric pressure exists in the pressurizing chamber and this pressure is applied to the apparatus in the chamber. When, however, pressure tanks are to be gaged, the vent 67 is closed and pressure from the top of the pressurized storage tank is transmitted to the pressurizing chamber through the manifold and pipe line 63, 62, 61. This pressure by itself imposes no load on the scale mechanism because of the arrangement of the load supporting rod 41 and drain pipe 52. The volume of air bubbled through the liquid is too small to affect the surface pressure.

It will be noted that the device above described has no moving parts which produce friction or resistance, hence, slight increments of pressure produce corresponding changes in dial reading without having to overcome friction caused by sliding parts.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. A device for use in determining the depth of a liquid of known specific gravity in a remote container and employing a supply of inert gas at a pressure in excess of the total pressure in the liquid at the bottom of the container and means to direct the gas into the bottom of a liquid containing container for release in the form of bubbles so that its pressure equals the total pressure at the point of release, said device comprising a force measuring mechanism having a body and indicating mechanism, a movable pendant load supporting rod connected to said force measuring mechanism for actuating the same, a tension rod connected to the load supporting rod, a frame fixedly carried by the body of the force measuring mechanism and having an apertured top wall through which the tension rod extends, a plurality of expansible bellows carried by the fixed frame and extending downwardly, a movable bellows-reaction plate below the frame and connected to the tension rod to be supported thereby and to transmit thereto expansive forces developed in the bellows, a gas conduit connected to the gas directing means and to the interior of the expansion bellows to supply gas to the bellows chambers at the pressure of the gas directing means whereby the scale is loaded according to the total effective area of the bellows multiplied by the gas pressure.

2. A device as claimed in claim 1, having a frame carried pressurizing housing about the bellows reaction plate, the bellows, the connections to the tension rod, and connections from the housing to the top of the remote liquid container whereby the outside of all the bellows may be subjected to the same pressure as that existing on the surface of the liquid in the remote container.

3. A device as claimed in claim 2, having a common drain from all the bellows extending out through the bottom of the housing and having an airtight connection with the housing.

4. A device as claimed in claim 1, wherein three bellows are employed, two of the bellows being substantially alike and having a total area slightly less than that required to provide an accurate scale reading, the third, or trimmer bellows being small and of a size to supply the deficiency in area.

5. A device as claimed in claim 4, when the small bellows is substantially in line with the tension rod and the two larger bellows are equidistant from the small bellows and on opposite sides thereof.

6. A device for gaging liquid depths in a remote container comprising a force measuring mechanism including a frame, a dial and a pointer movable over the dial, a pendant load supporting rod whose vertical movement is registered by the pointer, a yoke carried by said rod and extending downwardly and carrying a plate adapted to receive a load and actuate the pointer, a plate carried by said frame and within the yoke and above the first plate, expansion bellows between the plates, and a frame-carried gas pressure conduit opening into all the bellows so that the load applied is proportional to the pressure, and means to regulate the pressure to that sufficient to pass the gas through the depth of the liquid in the container.

7. A device as claimed in claim 6, wherein two bellows are substantially alike and have a total area insufficient to produce an optimum reading for a given pressure and a third small trimming bellows of a selected size to compensate for the deficiency of the other two.

8. An attachment for a force measuring device having a frame and pendant load supporting member which extends below the frame, comprising a body member adapted to be secured to the frame and including an apertured upper plate, a second plate supported below the upper plate and fixedly secured thereto, a secondary frame adapted to be supported from the load supporting member and including a bottom plate below the second plate and tension members connected to the said bottom plate and extending above the second plate, the secondary frame being freely vertically movable with respect to the body, a plurality of expansion bellows between the second plate and the bottom plate, and a pressure pipe supported from the body member and connected to all the bellows.

9. An attachment as claimed in claim 8, having a body-member-carried pressurizing housing about the secondary frame and bellows and bellows connections, and provided with an opening for connection to a pressurizing source independent of the pressure in the pressure pipe.

10. An attachment as claimed in claim 9, having a common drain from the bellows extending through the housing and sealed to the housing.

IVAN D. EBY.

References Cited in the file of this patent

UNITED STATES PATENTS

| Number | Name | Date |
|---|---|---|
| 2,079,069 | Johnson | May 4, 1937 |
| 2,294,770 | Bohannan | Sept. 1, 1942 |
| 2,345,464 | De Giers | Mar. 28, 1944 |
| 2,471,026 | Eby | May 24, 1949 |
| 2,527,171 | Allwein | Oct. 24, 1950 |

FOREIGN PATENTS

| Number | Country | Date |
|---|---|---|
| 669,828 | Germany | Jan. 5, 1939 |
| 704,129 | Germany | Mar. 24, 1941 |